United States Patent [19]
Benson et al.

[11] 3,858,546
[45] Jan. 7, 1975

[54] BATTER APPLYING MACHINE

[75] Inventors: Clark K. Benson, Millbrae; Andrew A. Caridis, Foster City; Arthur A. Nilsen, San Francisco, all of Calif.

[73] Assignee: Heat and Control, Inc., San Francisco, Calif.

[22] Filed: Nov. 24, 1972

[21] Appl. No.: 309,236

[52] U.S. Cl. ................ 118/16, 118/24, 118/324
[51] Int. Cl. ..................... B05c 5/00, B05c 11/12
[58] Field of Search ............. 118/16, 22, 24, 324; 198/198

[56] References Cited
UNITED STATES PATENTS

| | | | |
|---|---|---|---|
| 1,743,275 | 1/1930 | Kelling | 118/24 |
| 2,081,888 | 5/1937 | Birdsall | 118/16 |
| 2,320,529 | 6/1943 | MacManus | 118/24 |
| 3,596,633 | 8/1971 | Porter et al. | 118/16 |

*Primary Examiner*—John P. McIntosh
*Attorney, Agent, or Firm*—Flehr, Hohbach, Test, Albritton & Herbert

[57] ABSTRACT

A machine for coating an object with a viscid semi-liquid material has a frame-mounted endless conveyor of discrete strips to move the object beneath a material dispenser from which the material falls in a sheet-like flow over the object, the conveyor and into a reservoir for recirculation to the dispenser. An object-tumbling mechanism operates beneath the dispenser to remove bubbles in the coating and encourages complete coverage of the object. The conveyor discharge end has tynes in rotatable arrays to lift the object from the conveyor and to wipe the conveyor strips.

6 Claims, 8 Drawing Figures

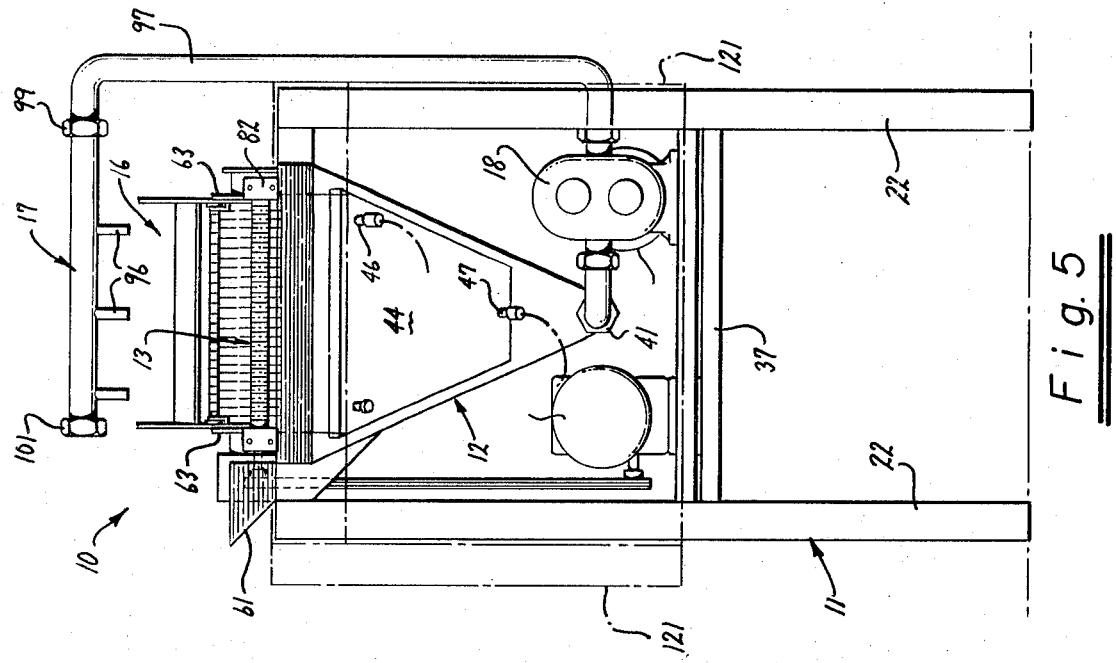
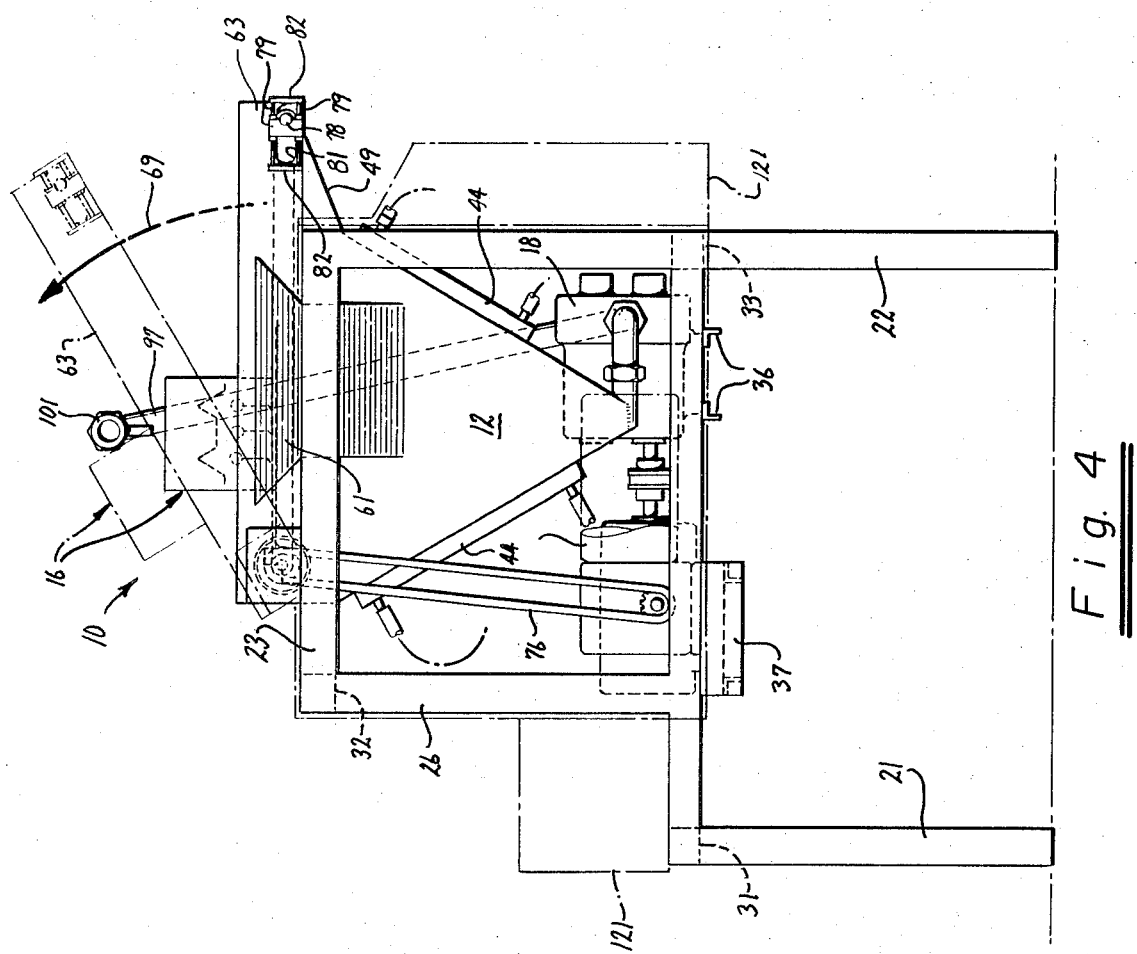

BATTER APPLYING MACHINE

BACKGROUND OF THE INVENTION

This invention pertains to food processing apparatus and specifically concerns an improved machine for suffusing or coating a food product with a viscid, semi-fluid material or batter.

In large quantity food preparation it is highly desirable to handle the food product in a continuous, as contrasted to a batch, process. In the case of coating a food product such as chicken parts or pet food kibbles prior to cooking the product in a deep fat fryer or the like, the product can be efficiently handled on a conveyor belt during the coating operation. However, a problem in coating parts on a conveyor belt is the buildup of batter, a highly viscid semi-fluid, on the belt creating a need for frequent cleaning of the conveyor belt.

Another problem in coating particles on a conveyor belt is the method for achieving coverage of the bottom of the particle and for filling voids left from exploded bubbles.

Puff-type food batters, such as the tempura batter, may be easily damaged if the material is not gently handled during the processing operations by the processing machinery. For this reason it is desirable that this material be handled as gently as possible consistent with efficient use of the coating machinery.

In summary the invention resides in apparatus for coating an object such as a food product with a viscid, semi-liquid material, such apparatus having a frame with an endless conveyor generally horizontally disposed on the frame, the conveyor having a product receiving and a product discharge end and including means to drive a conveyor. A coating station is disposed intermediate the conveyor ends, the station including dispenser means arranged to supply the coating material in a flow of substantially uniform thickness and extending laterally of the conveyor means. The conveyor means comprises a pair of spaced apart shaft rotatably mounted with respect to the frame, one of shafts being operatively coupled to the conveyor drive means. A plurality of laterally spaced apart, slender, smooth-surfaced continuous elements are reeved between said conveyor shafts and are formed of elastomeric material. The conveyor shaft disposed at the discharge end of the conveyor is equipped with an array of radially extending tynes disposed intermediate the conveyor elements.

An object of the invention is to provide an improved machine for coating food particles over substantially their entire surface area in a continuous fashion.

Another object of the invention is to provide a machine of the type described having a food product conveyor with positive discharge means and which is substantially self-cleaning.

Another object of the invention is to provide a machine of the type described including provisions for handling batter in a recirculation system which preserves the fragile properties of the batter material.

Another object of the invention is to provide in a machine of the type described means for tumbling the food product after a portion thereof has been coated so as to expose for coating other portions of the product surface area.

Another object of the invention is to provide means for positively lifting and releasing the coated food product from the conveyor belt so that the food product may be transferred to the next operation stage.

Further objects of the invention will appear from the drawings taken in connection with the description of the preferred embodiment as set out below.

BRIEF DESCRIPTION OF THE DRAWINGS

FIG. 4 is an elevation of one side of the apparatus as indicated by the arrows 4—4 of FIG. 1;

FIG. 5 is an end view taken in the direction of the arrows 5—5 of FIG. 1;

DESCRIPTION OF THE PREFERRED EMBODIMENT

Figure 1:
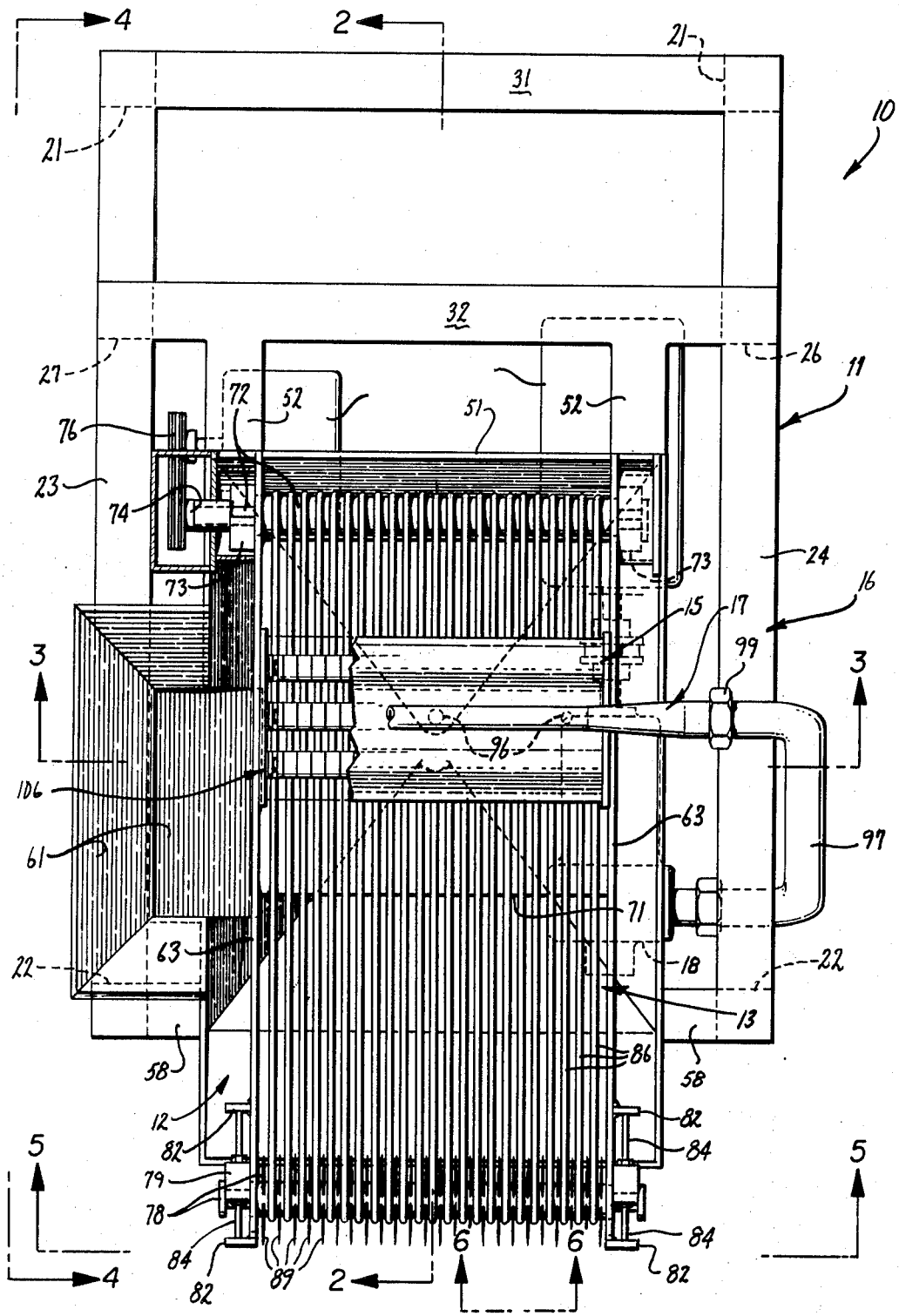
FIG. 1 is a plan view of the batter applying machine of the present invention.
Figure 2:
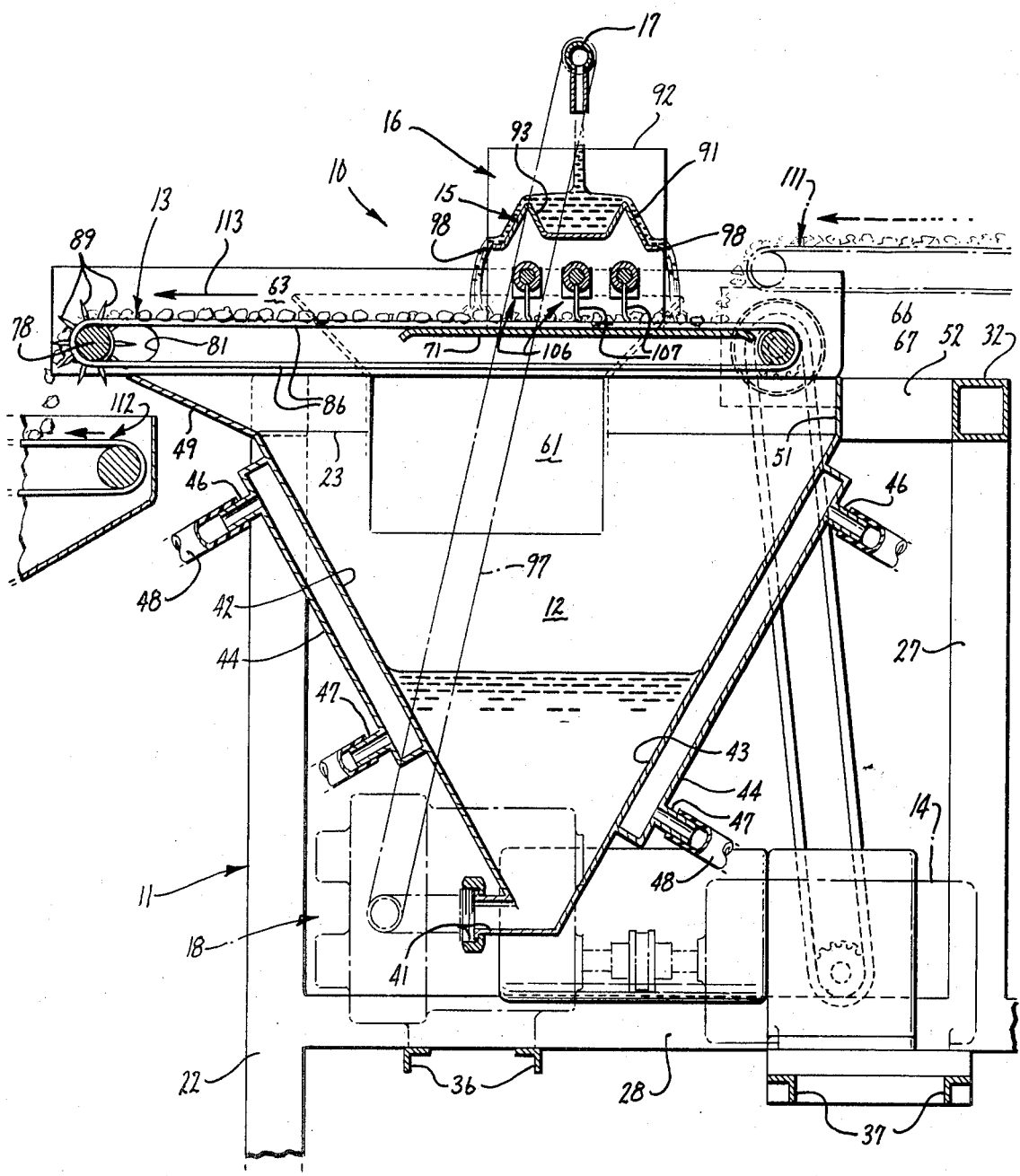
FIG. 2 is an elevational, sectional view taken in the direction of the arrows 2—2 of FIG. 1.
Figure 3:
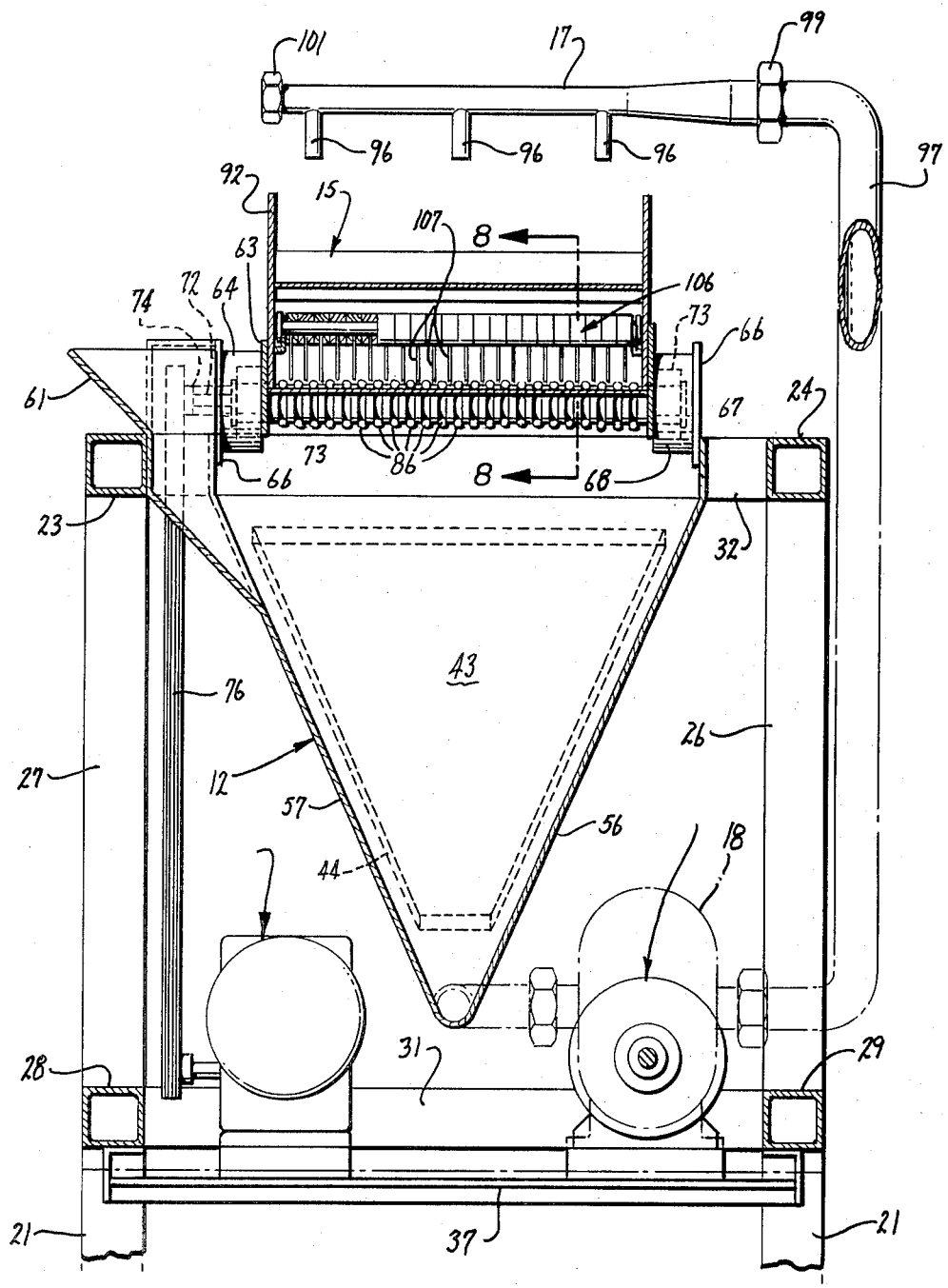
FIG. 3 is an elevational, sectional view taken in the direction of the arrows 3—3 of FIG. 1.

Referring to FIGS. 1 through 3, the coating apparatus 10, in accordance with the principles of the present invention, comprises in general a frame 11, an open top reservoir or tank 12 arranged below a generally, horizontally extending conveyor 13 which is powered from a motor and speed reduction unit 14. A coating station 15 including a dispenser 16 and manifold 17 is arranged intermediate the ends of the conveyor, and the manifold is in communication with a pump-motor unit 18 for circulating batter and the like coating materials from the reservoir to the dispenser 16.

The main frame 11 includes rear 21 and front 22 pairs of upright members (FIGS. 4 and 5), the front members 22 extending upwardly to connect with the horizontally disposed side members 23 and 24 which extend to the intermediate, vertically disposed frame members 26 and 27 which, in turn, are united to lower, horizontally extending frame members 28 and 29 connected to the principal frame upright members 21 and 22. Cross members 31, 32 and 33 are united to the horizontally disposed members to form a rigid machine frame. The above mentioned frame members are preferably formed of rectangular-sectioned, stainless steel tubing to take advantage of the properties of this shape in ease of cleaning, in strength, as well as in appearance. Horizontal supports 36 and 37 are arranged on the lower horizontal frame members 28 and 29 to serve as mounts for the motor drive unit 14 and the pump unit 18, as shown in FIGS. 2–5.

The reservoir or tank 12 (FIGS. 2 and 3) has the general shape of an inverted, four-sided pyramid, the base of which is open and the apex of which is equipped with a nozzle 41 arranged in communication with the pump 18. The front 42 and rear 43 walls of the tank are each equipped with a water jacket 44 for keeping the product within the tank at a desired temperature. The water jacket includes inlet and outlet nozzles 46 and 47, each equipped with tubing 48 for connection to the fluid source.

The front wall 42 of the reservoir is provided with an extension 49 which projects forwardly of the frame 11 terminating beneath the forward end of the product conveyor 13 so that any drippings of the coating material from the conveyor will return to the reservoir 12. The rear wall 43 is equipped with a vertical extension 51 to which is welded a spaced pair of struts 52 which is united to the cross member 32 (FIG. 1) furnishing support for the reservoir with respect to the frame. At the forward portion of the reservoir the side walls 56 and 57 are joined to the frame side members 23 and 24 by the struts 58 at the left-hand side of the reservoir. A chute-like opening 61 is provided on the left side of the reservoir so that the coating material may be loaded into the reservoir without interfering with operation of the product conveyor 13.

The product conveyor 13 is arranged above the open top tank or reservoir 12 and is driven by the motor 14 so that the direction of the product flow is from right to left, as viewed in FIG. 2 and as indicated by the arrow 113. The right-hand end in FIG. 2 functions as a product supply end of the conveyor and the left-hand end serves as the product discharge end. The product conveyor includes side plates 63 which are pivotally supported with respect to the side walls of the reservoir 56 and 57 by a pivot assembly 64 (FIGS. 1 and 3) arranged at the rear portion of each of the side plates 63. Each pivot assembly 64 includes a lug 66 fixedly secured to the adjacent reservoir side member and having a cylindrical opening 67 which rotatably receives a tubular element 68 which is rigidly connected to the conveyor side plate 63. Thus the side plate 63 and the tubular element 68 will pivot as a unit with respect to the lug member 66 attached to the reservoir so that the product conveyor may be rotated upwardly, as indicated by the arrow 64 in FIG. 4, for cleaning or servicing the reservoir and the conveyor.

Intermediate their ends the conveyor side plates 63 rigidly unite with a conveyor belt support plate 71 (FIG. 1), the lateral edges of which are turned down for unobstructed passage over the plate of the conveyor belt, and also to afford flow of the batter from the plate into the reservoir or tank 12. A drive shaft 72 is rotatably mounted with respect to the side plates 63 at the back end of the conveyor, bearing blocks 73 (FIG. 1) being fixedly secured to the side plates on the outsides so that the shaft ends may project therethrough, one end of the shaft being equipped with a pulley 74 for receiving power from the motor unit 14 through the associated belts 76. A pulley and belt guard 77 is secured to the top frame member 23 in surrounding relationship to the pulley as a safety measure.

At the forward end of the conveyor 13 an idler shaft 78 is arranged rotatably with respect to the side plates 63, the shaft ends being received in a mounting 79 which permits longitudinal adjustments of the idler shaft for selective tensioning of the conveyor belt assembly (FIGS. 1 and 4). More specifically, a horizontally elongated slot 81 (FIG. 2) is arranged in each side plate 63. Adjacent each end of the slot 81 (FIGS. 1 and 4) a lug 82 is secured to extend perpendicular outwardly of the side plate 63. A bearing member 83 which receives the adjacent end of the idler shaft 78 is supported with respect to the lug 82 by a pair of threaded rods 84 connected to the lug 82. Nuts 86 on the rods 84 engage the bearing member 83 for maintaining the end of the shaft 78 in a selected position with respect to the side plate 63.

Figure 6:
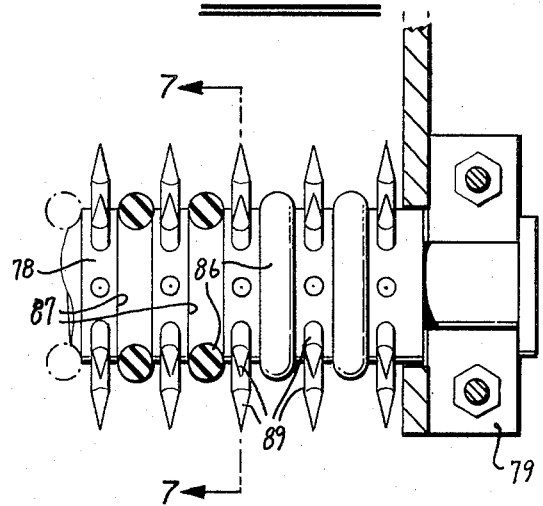
FIG. 6 is a fragmentary, detailed view taken in the direction of the arrows 6—6 of FIG. 1.

The belt structure for the conveyor 13 comprises a plurality of discrete belt elements or strips 86 of circular cross section and arranged as shown in FIG. 1 in side by side spaced relationship. One preferred form of the belt element or strip 86 is a rubber O-ring of substantially one-quarter inch diameter in cross section. As shown in FIG. 6, to accommodate the belt elements on the shaft 78, grooves 87 are formed in the shaft periphery at axially spaced intervals. The same groove detail on the idler shaft 78 is supplied to the drive shaft 72 so that the belt elements may be positively located on the shafts and so that ample surface contact is provided for the necessary frictional drive forces between the belt elements and the steel shafts.

Figure 7:
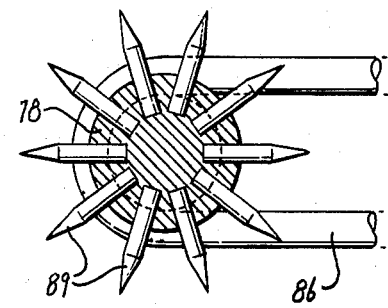
FIG. 7 is a view taken in the direction of the arrows 7—7 of FIG. 6.

Referring to FIGS. 2, 6 and 7, on the idler shaft 78 intermediate each pair of belt elements 86 there is arranged a product discharge assembly comprising an array of tyne or pin elements 89 disposed radially with respect to the shafts and projecting outwardly to end in a tapered point. As may be seen from FIGS. 2 and 7, the tyne or pin elements project substantially above the plane of the conveyor belt elements 86 so that when product is delivered in proximity with the tynes 89 the product is lifted from the conveyor, above the plane thereof, and pitched forwardly with a small amount of force to the next processing stage. It will be appreciated that the spacing of the belt elements 86 and the discharge array of tynes 89 is so selected so that the tynes furnish a wiping function with respect to batter or the like which may accumulate on the adjacent sides of the belt elements 86. A spacing on the order of one-sixteenth of an inch between the tyne and the belt elements 86 was found satisfactory so that a mutual wiping action would occur between the discharge assembly of the tynes and the belt elements 86. This has been found to substantially reduce the incidence of drops of batter falling into the next processing apparatus which may be a deep fryer or the like working unit. Further, the buildup of dried on batter on the conveyor belt is minimized.

The batter coating station 15 is arranged above the product conveyor and overlies the support plate 71 which in turn overlies the open top reservoir 12. Thus batter flowing from the coating station 15 may flow over the support plate 71 and be returned to the tank or reservoir 12. The dispensing or coating station includes the dispenser element 16 comprising upright end plates 92 (FIG. 3) and a double vee-shaped, horizontally disposed element 93 extending between the end plates 92 (FIG. 2). The dispenser is supported vertically by the conveyor support plate 71 and is removably arranged for ease of cleaning between the conveyor side plates 63 (FIG. 3).

The manifold 17 is equipped with a plurality of nozzles 96 which project downwardly for discharge into the interval between the two vees of the horizontal plate 93 where a volume of batter or similar coating material may accumulate before flowing over the apex of the vees. Coating material is circulated by the pump 18 through a conduit 97 connected to the manifold 17. A rapid disconnect coupling 99 unites the manifold 17 to the conduit 97 to facilitate cleaning. A plug 101 is arranged at the end of the manifold 17 so that access for cleaning may be had at both ends of the manifold. Batter is circulated from the reservoir by the pump through the conduit and manifold to the nozzles for discharge into the dispenser from which the batter may then fall over the lateral edges 98 of the dispenser in a sheet-like stream of substantially uniform thickness onto the product passing therebelow on the product conveyor.

Figure 8:
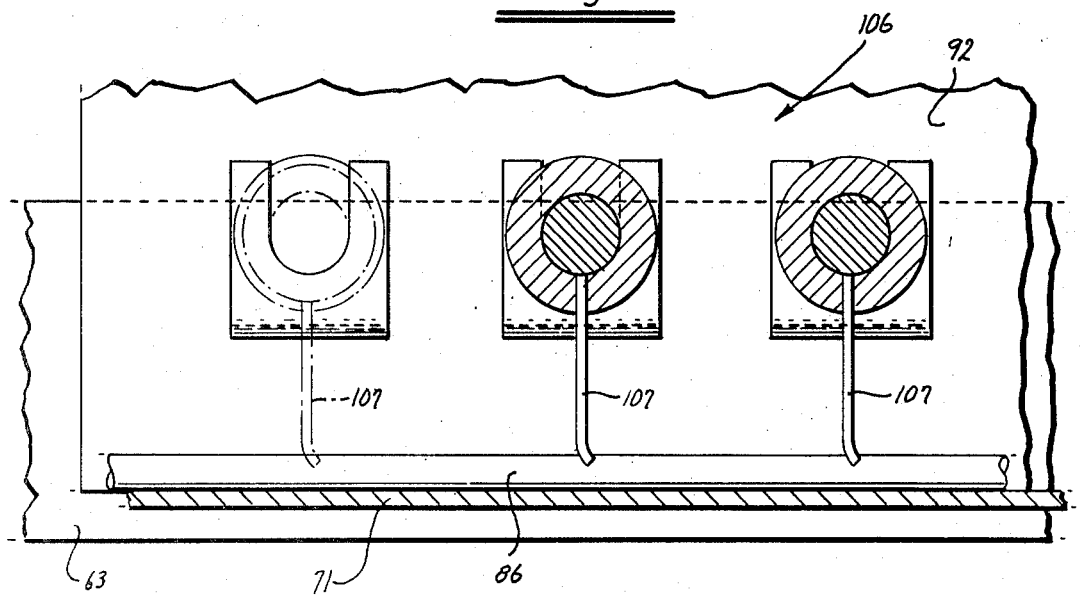
FIG. 8 is a transverse, sectional view taken in the direction of the arrows 8—8 of FIG. 3.

A product tumbling assembly 106 (FIGS. 2, 3 and 8) is provided so that products carried along the conveyor after receiving batter flowing from the first edge 98 of the dispenser may be turned over so that any voids on the product surface will be coated by the batter flowing from the second or forward edge 98 of the dispenser. More particularly, the tumbling apparatus 106 includes a plurality of slender hook-like elements or fingers 107, each mounted in a collar 108 rotatably carried by a shaft 109 which extends laterally of the product conveyor 13. The ends of the shaft 109 are removably supported by a bracket 111 (FIG. 3) fixedly secured to the inside of the upstanding side plates 92 of the dispenser. As best seen in FIG. 8, the finger-like elements 107 terminate in a horizontally extending portion disposed a small distance above the conveyor belt 86, the projections extending opposite to the path of conveyor travel so that the product will encounter the projection as it is moved along the belt. In one preferred embodiment, three rows of tumbling elements have been shown arranged beneath the dispenser although one or more rows of tumbling elements may suffice for certain products. Not only do the tumbler elements serve to shift the product with respect to the conveyor, but they also serve to break bubbles of batter material formed on the product surface. The voids left by bubble burst are filled by the second flow of batter at the forward end of the dispenser.

OPERATION

The coating apparatus 10 in its usual operation will be supplied with products from a product delivery conveyor indicated by the broken lines 111 of FIG. 2. The product may be a chicken part, pet food kibble or the like and after these parts have been treated by the coating apparatus 10 they are discharged therefrom into yet another processing stage which may comprise a deep fryer or the like indicated at 112 in FIG. 2. Prior to commencing the product coating operation, the reservoir or tank 12 is charged with batter which may be formed basically from flour and water and may contain a leavening agent such as baking powder or egg depending upon the recipe specified. The conveyor motor 114 is set into operation to drive the conveyor through the gear reducer unit so that the conveyor moves in the direction of the arrow 113 in FIG. 2. The batter pumping unit 18 is set into operation to supply batter to the dispenser station 16 through the manifold and nozzle 17, 96 so that batter will flow over the double vee-shaped plate and over the two edges 98 down onto the belt and support plate 71.

As product is deposited on the inlet end of the conveyor indicated at the right-hand side, as viewed in FIG. 2, it is carried first beneath the sheet of descending batter flowing off the rear or first encountered edge 98 of the dispenser. It should be appreciated at this juncture that a pool-like layer of batter accumulates upon the support plate 71 and the product is coated somewhat on the bottom portion by simple engagement with this pool of batter. As the product is carried forwardly it encounters the tumbling apparatus 107 and the hook-like elements cause the product to be shifted or turned and to burst air bubbles formed in the batter. As the product flows from beneath the dispenser other surfaces thereof are coated from the forward or second edge 98. The product is moved by the belt forwardly of the support plate 71 and batter drains from the product and belt through the spaced apart belt elements 86, the drippings falling into the open reservoir 12. When the product reaches the discharge apparatus 89, it is engaged by the tyne array, lifted from the belt elements and pitched slightly forwardly to be received by the next processing system. It will be appreciated that the tynes 89 and belt elements 86 furnish a mutual self-cleaning function such that very little of the batter material falls from the tynes into the next processing stage, and very little batter builds-up on the belt strips or elements 86.

The tank or reservoir 12 is maintained at even temperature by the jacketed side walls and the temperature-controlled fluid contained therein so that the delicate batter does not deteriorate during the processing stages. Additional batter may be charged into the reservoir through the chute-like opening 61 without disturbing the conveyor or processing operations.

In cleaning the coating apparatus 10 the manifold 17 is dismounted by releasing the coupling 99. After removing the dispenser and tumbling apparatus, the conveyor may be rotated into an upward position as indicated by the arrow 69 in FIG. 4 so that ready access may be had to the tank 12, as well as to the underside of the conveyor parts for cleaning or adjustment.

For purposes of appearance and cleanliness, a sheet steel housing is supplied to the frame as indicated by the broken lines 121 in FIGS. 4 and 5.

From the above description of the general principles of the present invention, and the foregoing detailed description of the drawings, those skilled in the art will readily comprehend the various modifications to which the invention is susceptible. For example, while there is shown in connection with the product tumbling apparatus 106 the finger elements 107, an equally effective structure could comprise a plurality of circular elements rotatable in a cam-like motion and disposed in the spaced between the conveyor strips.

It will also be understood that while the batter applying machine has been described in conjunction with the use on chicken parts and kibbles, it has great utility for coating other products with batter or other semi-liquids.

We claim:

1. Apparatus for applying batter to a food product comprising a frame, an endless food-product conveyor including top and bottom conveyor runs arranged on said frame, drive means serving to power said conveyor, a batter coating station on said frame serving to suffuse batter upon the product supported on the conveyor, said batter station including dispenser means disposed above and extending transversely of the top run of said conveyor serving to distribute batter therebelow, said conveyor comprising a pair of spaced apart shafts rotatably mounted with respect to said frame, one of said shafts being operatively coupled to said drive means, said top and bottom run of said conveyor being comprised of a plurality of laterally spaced apart, continuous, smooth surfaced elements formed from elastomeric material and reeved between said conveyor shafts, one of said shafts, intermediate said spaced apart continuous elements, being equipped with an array of radially extending tynes extending substantially above the plane of the top run of said conveyor and being arranged sufficiently close to said continuous conveyor elements so as to afford a mutual wiping action of the batter as between said tynes and said continuous conveyor elements.

2. The apparatus of claim 1 wherein said coating station is arranged to supply two longitudinally, spaced apart sheets of material extending laterally of said conveyor, and tumbling means arranged intermediate said two flow sheets of material serving to overturn the product on said conveyor.

3. The apparatus of claim 1 wherein a product tumbling apparatus is provided, said tumbling apparatus including a rod supported with respect to said frame and extending laterally of said product conveyor and arranged thereabove, a plurality of slender, elongate elements extending downwardly from said rod and terminating proximate the surface of said product conveyor, said elements being mounted upon said rods for swinging motions in the direction of conveyor movement when engaged by product carried by said conveyor.

4. The apparatus of claim 1 wherein said tynes are spaced apart axially of said shaft a distance at least equal to but less than twice the width of the adjacent conveyor element.

5. The apparatus of claim 1 wherein said batter coating station is arranged to supply to the top run of said conveyor two longitudinally spaced apart sheets of flowing batter material extending laterally of said top run, and product tumbling means arranged at said batter station intermediate said two flow sheets of material and serving to over-turn the product after it has encountered the first one of said flow sheets and before it has encountered the second flow sheet of material, the product being maintained on the same general conveyor plane.

6. The apparatus of claim 5 wherein said product tumbling means includes shaft means supported with respect to said frame and extending laterally of said product conveyor and arranged above the top run thereof, a plurality of slender, elongate tumbling elements extending downwardly from said shaft means and terminating proximate the top run of said conveyor, said tumbling elements being mounted on said shaft for swinging movement in the direction of conveyor movement when engaged by product carried by said conveyor serving to retard the same for an overturning action.

* * * * *